United States Patent
Kawamura et al.

(10) Patent No.: US 6,887,909 B2
(45) Date of Patent: May 3, 2005

(54) PROCESSES FOR PRODUCING AQUEOUS ALKYD RESIN DISPERSIONS

(75) Inventors: Chicara Kawamura, Hiratsuka (JP); Kei Ito, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 449 days.

(21) Appl. No.: 10/107,437

(22) Filed: Mar. 28, 2002

(65) Prior Publication Data

US 2002/0177636 A1 Nov. 28, 2002

(30) Foreign Application Priority Data

Mar. 30, 2001 (JP) ........................... 2001-102615

(51) Int. Cl.$^7$ ................ C08J 11/04; C08L 67/00
(52) U.S. Cl. ............... 521/48; 521/48.5; 523/501; 524/600; 524/845
(58) Field of Search ............ 521/48, 48.5; 524/600, 524/845; 523/501

(56) References Cited

U.S. PATENT DOCUMENTS

| | | | |
|---|---|---|---|
| 3,951,886 A | | 4/1976 | Miyake et al. |
| 4,594,374 A | * | 6/1986 | Stahl et al. ............. 523/501 |
| 5,252,615 A | | 10/1993 | Rao et al. |
| 5,858,551 A | | 1/1999 | Salsman |
| 2003/0212182 A1 | * | 11/2003 | Kayima et al. ............. 524/457 |

FOREIGN PATENT DOCUMENTS

| | | | |
|---|---|---|---|
| CA | 2087914 | | 7/1993 |
| EP | 0 558 905 | | 9/1993 |
| GB | 1 401 065 | | 7/1975 |
| JP | 11-228733 | | 8/1999 |
| JP | 11228733 A | * | 8/1999 |
| JP | 2000-191766 | | 7/2000 |
| WO | 01/16208 | | 3/2001 |

OTHER PUBLICATIONS

CIPO—Canadian Patent Database—Claims of 2,087,914.

* cited by examiner

Primary Examiner—Tae H. Yoon
(74) Attorney, Agent, or Firm—Wenderoth, Lind & Ponack, L.L.P.

(57) ABSTRACT

The present invention provides production processes of aqueous alkyd resin dispersions, said processes comprising a step of synthesizing alkyd resin by dissolving polyester resin whose chief component is terephthalic acid and which has been recovered from waste materials and regenerated, in a mixture of an alcoholic component, fatty acid and/or oil and fat, and polybasic acid component, said alcoholic component containing tri- or lower polyhydric alcohol and tetra- or higher hydric alcohol at a weight ratio of the former/latter within a range of 0–20, to effect depolymerizaiton and concurrently, esterification reaction; if necessary a step of introducing acid radicals into the resin; and a step of neutralizing and/or dispersing with use of surfactant, the so obtained alkyd resin in water. According to the processes of the present invention, aqueous alkyd resin dispersions can be prepared within a short time, using polyester resin which has been recovered from waste materials and regenerated.

30 Claims, No Drawings

PROCESSES FOR PRODUCING AQUEOUS ALKYD RESIN DISPERSIONS

This invention relates to processes for producing novel aqueous alkyd resin dispersions using polyester resins which have been recovered from waste materials such as disused PET bottles and regenerated.

In the past, terephthalic acid was normally not used as the dibasic acid component which is one of the starting materials for producing alkyd resins, or if used, only in minor amount, because terephthalic acid was more costly than isophthalic acid or phthalic anhydride and also because it tended to render the produced resins turbid or cause occurrence of foreign matters.

On the other hand, recently disposal of waste is becoming a serious issue and utilization of disused PET bottles by recycling is under study.

A production method of alkyd resins using polyester resins which have been recovered from waste materials such as disused PET bottles and regenerated is described in, for example, JP 11 (1999)-228733 A. Said method comprises subjecting recovered polyester resin and an alkyd resin oligomer having a molecular weight not higher than 5,000 and containing hydroxyl groups to depolymerization and transesterification. However, this method is subject to a number of problems such that it requires advance synthesis of the alkyd resin oligomer, requires many hours for the depolymerization because the amount of the alcohol component in the occasion of depolymerization is too low to sufficiently depolymerize the recovered polyester resin.

Also for preservation of terrestrial environment, studies are made in the field of paints for switching from organic solvent-based paint to aqueous paint, for reducing use of organic solvent which vaporizes into the atmosphere to induce air pollution. In respect of alkyd resins in which such polyethylene terephthalate that is recovered from waste materials and regenerated is used, similarly their conversion to aqueous type is under investigation.

For example, JP 5 (1993)-311114 A discloses a process which comprises reacting alcohol with polyethylene terephtalate which has been recovered from waste materials and regenerated, in the presence of catalyst and successively reacting the resulting reaction product with an acid component, neutralizing the formed composition with weak base, and adding water to convert it to an aqueous coating composition. This process, however, has a problem of requiring many hours for the reactions, because the depolymerization by means of alcoholysis is followed by the polycondensation reaction with the acid component.

JP 5 (1993)-271612 A discloses another process which comprises reacting polyethylene terephthalate, which has been recovered from waste materials and regenerated, with an acid component, successively reacting the reaction product with an alcohol component, neutralizing the formed composition with weak base, and adding water to make the composition an aqueous coating composition. However, according to said process the polycondensation reaction with the alcohol component is conducted after the depolymerization by means of acidolysis, and there is the problem of many hours being required for the reactions.

The object of the present invention is to provide a method for producing aqueous alkyd resin dispersions within a short time with ease, using the polyester resins which have been recovered from waste materials and regenerated.

We have engaged in concentrative studies with the view to accomplish the above object and now discovered that the object could be fulfilled by dissolving said regenerated polyester resin in a mixture of an alcoholic component which contains tetra- or higher hydric alcohol, fatty acid and/or oil and fat, and a polybasic acid component, and conducting the depolymerization and concurrently, the esterification; if necessary acid-modifying and neutralizing the resulting alkyd resin and thereafter dispersing it in water The present invention is whereby completed.

Thus, according to one aspect of the present invention, there is provided a production process of aqueous alkyd resin dispersion, which is characterized by comprising:

(A-1) a step of synthesizing an alkyd resin by depolymerizing polyester resin whose chief starting material is terephthalic acid and which has been recovered from waste materials and regenerated, while carrying out its esterification at the same time, by dissolving said polyester resin in a mixture of an alcoholic component in which the weight ratio of tri-or lower polyhydric alcohol to tetra-or higher hydric alcohol as the former/latter is within a range of 0–20, a fatty acid and/or an oil and fat, and polybasic acid component, and (C-1) a step of dispersing the alkyd resin which is obtained in the above step (A-1) in water, in the presence of 3–15 parts by weight of surfactant per 100 parts by weight of said alkyd resin. (This process is hereafter referred to as "the first process").

According to another aspect of the present invention, there is provided a production process ("the second process") of aqueous alkyd resin dispersion, which is characterized by comprising:

(A-2) a step of synthesizing an alkyd resin having a hydroxyl value of 0.1–50 mgKOH/g by depolymerizing polyester resin whose chief starting material is terephthalic acid and which has been recovered from waste materials and regenerated, while carrying out its esterification at the same time, by dissolving said polyester resin in a mixture of an alcoholic component in which the weight ratio of tri-or lower polyhydric alcohol to tetra- or higher hydric alcohol as the former/latter is within a range of 0–20, a fatty acid and/or an oil and fat, and polybasic acid component, (B-2) a step for obtaining a maleinized alkyd resin having an acid value of 10–200 mgKOH/g by reacting the alkyd resin as obtained in the above step (A-2) with maleic anhydride, and (C-2) a step of neutralizing and dispersing in water the maleinized alkyd resin as obtained in the above step (B-2).

According to still another aspect of the present invention, there is provided a production process ("the third process") of aqueous alkyd resin dispersion which is characterized by comprising:

(A-3) a step of synthesizing an alkyd resin having a hydroxyl value of 5–200 mgKOH/g by depolymerizing polyester resin whose chief starting material is terephthalic acid and which has been recovered from waste materials and regenerated, while carrying out its esterification at the same time, by dissolving said polyester resin in a mixture of an alcoholic component in which the weight ratio of tri- or lower polyhydric alcohol to tetra- or higher hydric alcohol as the former/latter is within a range of 0–20, a fatty acid and/or an oil and fat and polybasic acid component, (B-3) a step for obtaining a modified alkyd resin having an acid value of 10–200 mgKOH/g by reacting the alkyd resin as obtained in the above step (A-3) with an acid anhydride having no ethylenically unsaturated group, and (C-3) a step of neutralizing and dispersing in water the modified alkyd resin as obtained in the above step (B-3).

According to a still different aspect of the present invention, there is provided a production process ("the fourth process") of an aqueous alkyd resin dispersion which is characterized by comprising:

(A-4) a step of synthesizing an alkyd resin having an acid value of 10–200 mgKOH/g by depolymerizing polyester resin whose chief starting material is terephthalic acid and which has been recovered from waste materials and regenerated, while carrying out its esterification at the same time, by dissolving in a mixture of an alcoholic component in which the weight ratio of tri- or lower polyhydric alcohol to tetra- or higher hydric alcohol is within a range of 0–20, a fatty acid and/or an oil and fat, as the former/latter and polybasic acid component, and (C-4) a step of neutralizing and dispersing in water the alkyd resin as obtained in the above step (A-4).

According to the present invention, furthermore, paint compositions containing the aqueous alkyd resin dispersion as prepared by any of the foregoing first to fourth processes are provided.

Hereinafter the first through fourth processes of the present invention are explained in further details.

Those polyester resins made chiefly from terephthalic acid, which have been recovered from waste materials and regenerated, and which are used in the first to fourth processes of this invention (hereafter the polyester resins may be abbreviated as "regenerated PES") include polyethylene terephthalate (e.g., PET bottles) which are recovered for recycling of resources, industrial waste polyethylene terephthalate, and polyester resins regenerated from the wastes occurring in the course of production of polyester products (film, fibers, automobile parts, electric and electronic parts, etc.) such as polyethylene terephthalate or polybutylene terephthalate made chiefly from terephthalic acid. In particular, recycled polyethylene terephthalate is suitable. The regenerated PES is normally used in the form of chips or pulverized pieces.

In the step (A-1) of the first process, step (A-2) of the second process, step (A-3) of the third process and step (A-4) of the fourth process (hereafter they are collectively referred to as "(A) step of the present process invention"), alkyd resins are synthesized by dissolving such regenerated PES in a mixture of an alcoholic component containing tetra- or higher hydric alcohol(s) and optionally tri- or higher polyhydric alcohol(s); fatty acid and/or oil and fat; and a polybasic acid component, and carrying out the depolymerization in the presence of a depolymerization catalyst and at the same time, the esterification reaction. The term, "esterification reaction", as used herein includes ordinary esterification reactions and transesterification reactions.

Examples of tetra- or higher hydric alcohols in the above alcoholic component include diglycerine, triglycerine, pentaerythritol dipentaerythritol and sorbitol. Of those, pentaerythritol is particularly suitable because of favorable curing and drying property of the painted film of the paint compositions in which the resulting alkyd resin is used. Also examples of tri- or lower poplyhydric alcohols include: trihydric alcohols such as trimethylolpropane, trimethylolethane, glycerine and tris(2-hydroxyethyl) isocyanurate; and dihydric alcohols such as ethylene glycol diethylene glycol triethylene glycol propylene glycol, 1,3-propanediol 1,4-butanediol 1,5-pentanediol neopentyl glycol 1,6-hexanediol and 1,4-dimethylolcyclohexane. Of those, glycerine, ethylene glycol, diethylene glycol, triethylene glycol and propylene glycol are particularly suitable, from the standpoints of depolymerization ability as used in mixtures with said tetra- or higher polyhydric alcohols (e.g., pentaerythritol) and low-temperature dissolving ability of high temperature-melting tetra- or higher polyhydric alcohols.

In the alcoholic component, the blend ratio of tri- or lower polyhydric alcohols to tetra- or higher polyhydric alcohols as the former/latter by weight should be within a range of 0–20, preferably 0.02–10, inter alia 0.05–5.

As the fatty acids to be mixed with the alcoholic component, for example, those of soybean oil, safflower oil, linseed oil, tall oil, coconut oil, palm kernel oil castor oil, dehydrated castor oil, fish oil and tung oil may be named. Of those fatty acids, those of drying oils or semi-drying oils having iodine values of at least 90, inter alia, those of soybean oil and tall oil, are preferred.

The oil and fat to be mixed with the alcoholic component are triglycerides of fatty acids, and their specific examples include the following: soybean oil, safflower oil linseed oil, tall oil, coconut oil, palm kernel oil, castor oil, dehydrated castor oil, fish oil and tung oil. In particular, drying or semi-drying oils having iodine values of at least 90 are preferred, inter alia, soybean oil and tall oil are advantageous.

The total amount of the selected fatty acid and/or oil and fat in the mixture is such that the oil length of the resulting alkyd resin should fall within a range 30–70%, preferably 40–60%, for imparting adequate drying property and physical performance of the dry painted films of paint compositions of the present invention.

As the polybasic acid component to be concurrently used with above alcoholic component, fatty acid and/or oil and fat, those customarily used as the acid component for forming alkyd resins can be similarly used. For example, dibasic acids such as phthalic anhydride, isophthalic acid, terephthalic acid, tetrahydrophthalic anhydride, hexahydrophthalic anhydride, naphthalenedicarboxylic acid, 4,4'-biphenyldicarboxylic acid, diphenylmethane-4,4'-dicarboxylic acid, succinic acid, fumaric acid, adipic acid, sebacic acid and maleic anhydride; tri- and higher polybasic acids such as trimellitic anhydride, pyromellitic anhydride, trimesic acid and methylcyclohexene-tricarboxylic acid; and $C_1$–$C_6$ (in particular, $C_1$–$C_4$) alkyl esters of those dibasic acids or tri- and higher polybasic acids can be named. Of those, dibasic acids and their $C_1$–$C_6$ (in particular, $C_1$–$C_4$) alkyl esters are preferred.

Such polybasic acid component is generally used within a range such that the equivalent number of the carboxyl groups in the polybasic acid component per hydroxyl equivalent in the alcoholic component should be within a range of 0.2–1.5, in particular, 0.4–1.4.

Here the term, "carboxyl groups of the polybasic acid component", is used to signify the value as converted to the carboxyl groups formed upon hydrolysing the esters, where the polybasic acid component is an ester of a polybasic acid.

The blend ratios of the alcoholic component, the fatty acid and/or the oil and fat, and the polybasic acid component in the mixture are not critical. Generally suitable ratios are, as the alcoholic component/the fatty acid and/or the oil and fat/the polybasic acid component, 100/50–700/50–400 by weight, in particular, 100/75–600/75–300, by weight.

In the processes of the present invention, depolymerization of regenerated PES progresses in the absence of catalyst, at temperatures not lower than the melting point of the regenerated PES (at least 240° C. for regenerated PET). For conducting the depolymerization at temperatures lower than said point, or with higher efficiency, it is generally preferable to use a depolymerization catalyst.

Examples of depolymerization catalyst used in said occasions include monobutyltin hydroxide, dibutyltin oxide, monobutyltin-2-ethyl hexanoate, dibutyltin dilaurate, stannous oxide, tin acetate, zinc acetate, manganese acetate, cobalt acetate, calcium acetate, lead acetate, litharge, antimony trioxide, tetrabutyl titanate and tetraisopropyl titanate. The use rate of the depolymerization catalyst is, per 100 weight parts of the total sum of the regenerated PES, alcoholic component, the fatty acid and/or the oil and fat, and the polybasic acid component, normally conveniently within a range of 0.0005–10 parts, in particular, 0.001–5 parts, by weight. These depolymerization catalysts can normally serve also as catalysts for the esterification reaction.

The (A) step of the present process invention effects reactions of a mixture of above-described regenerated PES with the alcoholic component, the fatty acid and/or oil and fat, and the polybasic acid collectively, if necessary in the presence of a depolymerization catalyst. In this reaction, depolymerization reaction of the regenerated PES and esterification reaction between the regenerated PES with the alcoholic component, the fatty acid and/or oil and fat, and the polybasic acid component progress almost simultaneously to form an alkyd resin. The alkyd resin-forming conditions in that occasion are not critical, so long as the depolymerization and the esterification reaction can concurrently take place. For example, an alkyd resin can be prepared by allowing the mixture to react for around 2 to 10 hours at temperatures between about 160° C. to about 270° C., preferably between about 200° C. to about 260° C., under stirring, if necessary in the presence of a depolymerization catalyst.

According to the (A) step of the present process invention, the reaction can be substantially shortened by reacting regenerated PES, alcoholic component, fatty acid and/or oil and fat, and polybasic acid component, collectively in a lump.

In that occasion, it is adequate to use the regenerated PES in such an amount that the oil length of the formed alkyd resin ranges 30–70%, preferably 40–60%, for obtaining favorable drying ability and physical properties of dry paint film formed by applying a paint composition of the present invention. For accomplishing this, generally suitable use ratio of regenerated PES is 2–40%, in particular, 5–35%, by weight, based on the total weight of the regenerated PES, the alcoholic component, fatty acid and/or oil and fat and the polybasic acid component.

In the alkyd resin production, coloring of the formed alkyd resins can be inhibited by adding to the reaction system in advance, a minor amount, for example, 0.1–10 parts by weight, of phosphorus compound per 100 parts by combined weight of the regenerated PES, alcoholic component, fatty acid and/or oil and fat, and polybasic acid component, and carrying out the esterification reaction. Examples of useful phosphorus compound include: phosphoric acid, phosphorous acid and hypophosphorous acid; and alkyl esters or phenyl esters of these acids (e.g., trimethyl phosphite, trimethyl phosphate, triphenyl phosphite and triphenyl phosphate).

After termination of the depolymerization and esterification reactions, the resulting alkyd resins are normally cooled. While they may be withdrawn as they are, they may also be diluted with an organic solvent before the withdrawal, to improve filterability and handling property. The kind of the organic solvent is not critical, so long as it can dissolve alkyd resins.

The First Process of the Present Invention

In the first process, it is preferred for favorable water resistance and physical properties of coating film where the film is formed by applying a paint composition of the present invention and drying the same, that the carboxyl equivalent number in the polybasic acid component per one hydroxyl equivalent in the alcoholic component in the system be within a range of 0.2–1, in particular, 0.4–0.99.

It is generally preferable for the alkyd resin which is obtained in the step (A-1) to have a number-average molecular weight ranging 2,000–24,000, in particular, 2,500–20,000; a hydroxyl value ranging 0.1–150 mgKOH/g, in particular, 1–130 mgKOH/g; and an acid value ranging 0.1–150 mgKOH/g, in particular, 1–100 mgKOH/g.

In the first process of the present invention, the alkyd resin which is synthesized in the above step (A-1) is formed into an aqueous dispersion in the presence of a surfactant in the step (C-1). The surfactant used in that occasion may be of any type, such as nonionic, anionic or cationic. Examples of nonionic surfactant include polyoxyethylene alkyl ether, polyoxyethylene alkylphenol ether, polyoxyethylene alkyl ester and sorbitan alkyl ester. In particular, those whose HLB is within a range of 10–16 are preferred. As anionic surfactant, for example, dodecylbenzenesulfonate, alkylsulfuric ester, alkylbenzenesulfonate, alkylphosphate, monoalkylsodium succinate and dialkylsodium sulfosuccinate may be named. As cationic surfactant, for example, octadecylamine acetate, tetradecylamine acetate, octadecyltrimethylammonium chloride, dodecyl trimethylammonium chloride and octadecyldimethylbenzylammonium chloride may be named. These surfactants can be used in an amount within a range of 3–15 parts by weight, preferably 2–10 parts by weight, per 100 weight parts of the alkyd resin.

Aqueous dispersions of the alkyd resin can be formed by various methods. For example, such methods as (1) mixing the alkyd resin with selected surfactant and slowly adding water to the mixture to effect aqueous dispersing, (2) after mixing the alkyd resin with the surfactant, adding a neutralizer to the mixture to neutralize the latter and then slowly adding water to effect aqueous dispersing; or (3) simultaneously mixing the alkyd resin, surfactant and neutralizer and slowly adding water to the mixture to form an aqueous dispersion, may be conducted.

In the occasion of slowly adding water to form the aqueous dispersion, a high-speed rotation stirrer such as disperser-type stirrer or the like can be conveniently used. It is generally preferable to conduct the dispersing in water to such an extent that the average diameter of the dispersed particles should fall within a range of 0.1–5 $\mu$m, in particular, 0.1–1.0 $\mu$m.

Examples of the neutralizer include organic amines such as trimethylamine, triethylamine, tripropylamine, dimethylamine, diethylamine, 2-dimethylaminoethanol and 2-diethylaminoethanol; and ammonia.

In the occasion of dispersing the alkyd resin in water, if necessary it is permissible to concurrently use water-soluble organic solvent to effect uniform and easy dispersion. Examples of useful water-soluble organic solvent include ethylene glycol mono-n-butyl ether, ethylene glycol monoethyl ether, diethylene glycol monomethyl ether, diethylene glycol mono-n-butyl ether, ethylene glycol dimethyl ether, diethylene glycol dimethyl ether, ethylene glycol monomethyl ether acetate, diacetone alcohol dioxane, tetrahydrofuran, acetone and dimethylformamide. The blend ratio of such an organic solvent may be not more than 50 parts, in particular, from 5 to 30 parts, per 100 parts of the alkyd resin, the parts being by weight.

Second Process of the Present Invention

According to the second process of the present invention, in the alkyd resin-synthesizing step (A-2), an alkyd resin having a hydroxyl value of 0.1–50 mgKOH/g, preferably 0.1–30 mgKOH/g, is synthesized, generally by reacting the reactants at such a ratio that the carboxyl equivalent number in the polybasic acid component per hydroxyl equivalent in the alcoholic component in the system falls within a range of 0.2–1.2, preferably 0.4–1.1.

The alkyd resin obtained in the step (A-2) generally has a number-average molecular weight within a range of 2,000–24,000, in particular, 2,500–20,000, and a hydroxyl value of 0.1–150 mgKOH/g, in particular, 1–130 mgKOH/g.

In the step (B-2) of the second process of the present invention, the alkyd resin as obtained in the above step (A-2) is reacted with maleic anhydride to form maleinized alkyd resin having an acid value within a range of 10–200 mgKOH/g, in particular, 10–150 mgKOH/g. The reaction of the alkyd resin with maleic anhydride can normally be conducted by mixing them at such a ratio that maleic anhydride is within a range of 0.8–22 parts, in particular, 1.0–15 parts, per 100 parts of the alkyd resin, the parts being by weight; and heating at temperatures ranging 150–200° C. for about 0.5–20 hours, whereby inducing an addition reaction of the maleic anhydride to the alkyd resin to form the intended maleinized alkyd resin.

In the step (C-2) of the second process of the present invention, the maleinized alkyd resin as obtained in above step (B-2) is neutralized and dispersed in water. The neutralization and dispersion can be conducted by various methods. For example, (1) a method comprising neutralizing the acid redicals contained in the alkyd resin with a neutralizing agent, then if necessary mixing it with a surfactant, and slowly adding water to the neutralized product to effect its dispersion in water; (2) a method comprising mixing the alkyd resin with a surfactant, adding a neutralizing agent to the mixture to neutralize the latter and slowly adding water to form an aqueous dispersion; and (3) a method comprising simultaneously mixing the alkyd resin, surfactant and a neutralizing agent and slowly adding water to the mixture to form an aqueous dispersion, can be practiced. As the surfactant and neutralizing agent, those similar to the exemplified in respect of the first process of the present invention can be used, and the dispersion in water can be conducted in the manner similar to the first process of the present invention.

Third Process of the Present Invention

According to the third process of the present invention, in the alkyd resin-synthesizing step (A-3), an alkyd resin having an acid value of 5–200 mgKOH/g, preferably 10–150 mgKOH/g, is synthesized, generally by reacting the reactants at such a ratio that the carboxyl equivalent number in the polybasic acid component per hydroxyl equivalent in the alcoholic component in the system falls within a range of 0.2–1.00, preferably 0.4–0.99.

The alkyd resin obtained in the step (A-3) generally has a number-average molecular weight within a range of 2,000–24,000, in particular, 2,500–20,000, and an acid value of 0.1–150 mgKOH/g, in particular, 1–100 mgKOH/g.

According to the third process of the present invention, in the step (B-3) an alkyd resin which is obtained through the step (A-3) of the first process is reacted with an acid anhydride free of ethylenically unsaturated radical, to form a modified alkyd resin having an acid value within a range of 5–200 mgKOH/g, in particular, 10–100 mgKOH/g. The reaction between the alkyd resin and the ethylenically unsaturated radical-free acid anhydride is normally conducted by mixing the two at such a ratio that the acid anhydride radidcals in the acid anhydride is within a range of 0.1–1 equivalent, in particular, 0.1–0.5 equivalent, per one hydroxyl equivalent in the alkyd resin, and heating the mixture at temperatures ranging 80–200° C., for about 0.25–10.0 hours. Whereby a half-esterification reaction is induced and the intended modified alkyd resin into which carboxyl groups are introduced is obtained.

Examples of the acid anhydride free of ethylenically unsaturated radicals which is used for modifying the alkyd resin in the above step (B-3) include phthalic anhydride, trimellitic anhydride, hexahydrophthalic anhydride, tetrahydrophthalic anhydride, succinic anhydride and maleic anhydride. Of those, phthalic anhydride, trimellitic anhydride and hexahydrophthalic anhydride are preferred.

In the step (C-3) of the third process of the present invention, the modified alkyd resin which is obtained in the above step (B-3) is neutralized and dispersed in water. The neutralization and dispersion can be conducted in the manner similar to those as described as to the step (C-2) in the above second process of the present invention.

Fourth Process of the Present Invention

According to the fourth process of the present invention, in the step (A-4) for synthesizing an alkyd resin, the reaction is conducted normally at such ratio of the reactants that the carboxyl equivalent number in the used polybasic acid component per one hydroxyl equivalent in the alcoholic component present in the system falls within a range of 0.5–1.5, preferably 0.6–1.4, and an alkyd resin having an acid value of 10–200 mgKOH/g, in particular, 15–150 mgKOH/g is synthesized.

The alkyd resin obtained through this step (A-4) preferably has a number-average molecular weight ranging 2,000–24,000 in particular, 2,500–20,000, and a hydroxyl value ranging 0.1–150 mgKOH/g, in particular, 1–130 mgKOH/g.

According to the fourth process of the present invention, the alkyd resin obtained through the above step (A-4) is neutralized and dispersed in water in step (C-4). The neutralization and dispersion can be conducted in the manner similar to those described in respect of the step (C-2) of the second process of the present invention.

An alkyd resin in the aqueous dispersions as obtained by the first to fourth processes of the present invention preferably has an oil length or 30–70%, in particular, 40–60%; a number-average molecular weight of 2,000–24,000, in particular, 2,500–20,000.

Of the aqueous dispersions of alkyd resins obtained by the first through fourth processes of the present invention, those in which drying oil fatty acids or semi-drying oil fatty acids are used as the fatty acid component excel in oxidation-drying property and are conveniently used as aqueous resin dispersions for normal temperature-curing type paints. Where they are used as aqueous resin dispersions for normal temperature-curing type paints, the drying property can be still improved by concurrent use of metal compound dryers such as cobalt naphthenate, zirconium naphthenate, lead naphthenate and the like.

Of the aqueous dispersions of alkyd resins obtained by the first through fourth processes of the present invention, those in which saturated fatty acids are used as the fatty acid component can be conveniently used as aqueous resin dispersions for thermosetting paints, in combination with curing agents reactable with hydroxyl groups, such as amino resins like melamine resin, polyisocyanate compound, epoxy compound and the like.

Paint compositions of the present invention which contain the aqueous dispersions of alkyd resins as obtained by the processes of the present invention can be prepared by methods known per se for preparation of water paints, provided that an aqueous dispersion of alkyd resin of the invention is used as at least a part of the resin binder therein.

EXAMPLES

Hereinafter the invention is more specifically explained with reference to Examples, in which parts and percentages are by weight.

Production Example 1

A reactor equipped with a thermometer, stirrer, heater, rectification column and a water-separation means was charged with 472 parts of pentaerythritol 1134 parts of soybean oil fatty acid, 400 parts of phthalic anhydride and 453 parts of benzoic acid, which were heated to 170° C. under stirring. Then 24 parts of dibutyltin oxide and 130 parts of regenerated polyethylene terephthalate (regenerated PET) were added to the system, slowly heated to 250° C. consuming 2 hours and maintained at the same temperature for an hour. At that time point 120 parts of xylene for refluxing was added, and the depolymerization and dehydrative condensation reaction were conducted at 230° C. for about 4 hours, to provide an alkyd resin varnish containing 95% of non-volatile component. Eight (8) hours were required for the production of said alkyd resin varnish. The varnish had a resin acid value of 5.2 mgKOH/g, and when it was diluted to a solution containing 75% of non-volatile component with ethylene glycol mono-n-butyl ether, the solution had a Gardner viscosity (25° C.) of S.

Example 1

To 2,400 parts of the alkyd resin, which was obtained by removing under reduced pressure the xylene in the alkyd resin varnish containing 95% of non-volatile component as provided by Production Example 1, 800 parts of ethylene glycol mono-n-butyl ether was added, and when the temperature was cooled to about 60° C., 22 parts of triethylamine and 240 parts of NOIGEN EA 150™ (a nonionic surfactant which is polyoxyethylene nonyl phenyl ether, Dai-ichi Kogyo Seiyaku Co., Ltd.) were added. After mixing the system for 30 minutes at around 60° C., 1340 parts of deionized water was gradually added under high-speed stirring, to provide an aqueous alkyd resin dispersion containing 51% of non-volatile component.

Example 2

Twenty-four hundred (2400) parts of the alkyd resin, which was obtained by removing under reduced pressure the xylene in the alkyd resin varnish containing 95% of non-volatile component as provided by Production Example 1, was cooled to about 60° C., and to which 22 parts of triethylamine and 120 parts of CATIOGEN H™ (a quaternary ammonium salt-derived cationic surfactant, Dai-ichi Kogyo Seiyaku Co., Ltd.) were added. After mixing the system for 30 minutes at around 60° C., 2258 parts of deionized water was gradually added under high-speed stirring, to provide an aqueous alkyd resin dispersion containing 51% of non-volatile component.

Example 3

To 2,400 parts of the alkyd resin which was obtained by removing under reduced pressure the xylene in the alkyd resin varnish containing 95% of non-volatile component as provided by Production Example 1, 800 parts of ethylene glycol mono-n-butyl ether was added, and when the temperature was lowered to about 60° C., 120 parts of CATIOGEN H™ (a quaternary ammonium salt-derived cationic surfactant, Dai-ichi Kogyo Seiyaku Co.Ltd.) was added. After mixing the system for 30 minutes at around 60° C., 1480 parts of deionized water was gradually added under high-speed stirring, to provide an aqueous alkyd resin dispersion containing 50% of non-volatile component.

Example 4

To 2,400 parts of the alkyd resin which was obtained by removing under reduced pressure the xylene in the alkyd resin varnish containing 95% of non-volatile component as provided by Production Example 1, 800 parts of ethylene glycol mono-n-butyl ether was added, and when the temperature was lowered to about 60° C., 11 parts of triethylamine and 120 parts of HITENOL N-08™ (an anionic surfactant which is a sulfuric acid ester salt having polyoxyethylene chain, Dai-ichi Kogyo Seiyaku Co., Ltd.) were added. After mixing the system for 30 minutes at around 60° C., 1469 parts of deionized water was gradually added under high-speed stirring, to provide an aqueous alkyd resin dispersion containing 50% of non-volatile component.

Comparative Example 1

A reactor equipped with a thermometer, stirrer, heater, a rectification column and a water-separation means was charged with 472 parts of pentaerythritol 130 parts of regenerated polyethylene terephthalate (regenerated PET) and 24 parts of dibutyltin oxide. The temperature was raised to 230° C., and at which temperature the reaction was carried out for about 3 hours until the regenerated PET dissolved and reacted, to give a transparent reaction product. Then 120 parts of xylene for refluxing, 1134 parts of soybean oil fatty acid, 400 parts of phthalic anhydride and 453 parts of benzoic acid were charged, the temperature of the system was raised to 230° C. under stirring over the subsequent 3 hours, and the dehydrative condensation reaction was conducted at 230° C. for about 4 hours. Thus an alkyd resin varnish having a resin acid value of about 4.9 mgKOH/g and containing 95% of non-volatile component was obtained. Eleven (11) hours were required for the production of said alkyd resin varnish. When this alkyd resin varnish was diluted with ethylene glycol mono-n-butyl ether to a solution containing 75% of non-volatile component, the solution had a Gardner viscosity (25° C.) of TU.

To 2,400 parts of the alkyd resin which was obtained by removing under reduced pressure the xylene in the resulting alkyd resin varnish containing 95% of non-volatile component, 800 parts of ethylene glycol mono-n-butyl ether was added, and when the temperature was lowered to about 60° C., 22 parts of triethylamine and 240 parts of NOIGEN EA 150™ were added. After mixing the system for 30 minutes at around 60° C., 1340 parts of deionized water were gradually added under high-speed stirring, to provide an aqueous alkyd resin dispersion containing 51% of non-volatile component.

Comparative Example 2

A reactor equipped with a thermometer, stirrer, heater, rectification column and a water-separation means was charged with 495 parts of pentaerythritol, 1187 parts of soybean oil fatty acid, 444 parts of phthalic anhydride, 474 parts of benzoic acid, 24 parts of dibutyltin oxide and 120 parts of xylene. The temperature of the system was then raised to 230° C. over the subsequent 3 hours, and the dehydrative condensation reaction was conducted at 230° C. for about 8 hours. An alkyd resin varnish having a resin acid value of about 7.0 mgKOH/g and containing 95% of non-volatile component was obtained. For the production of same alkyd resin varnish, 12 hours were required. When this alkyd resin varnish was diluted with ethylene glycol mono-n-butyl ether to a solution containing 75% of non-volatile component, the solution had a Gardner viscosity (25° C.) of QR.

To 2,400 parts of the alkyd resin which, was obtained by removing under reduced pressure the xylene in the resulting alkyd resin varnish containing 95% of non-volatile component, 800 parts of ethylene glycol mono-n-butyl ether was added, and when the temperature was lowered to about 60° C., 22 parts of triethylamine and 240 parts of NEUGEN EA 150™ were added. After mixing the system for 30 minutes at around 60° C., 1340 parts of deionized water were gradually added under high-speed stirring, to provide an aqueous alkyd resin dispersion containing 51% of non-volatile component.

Example 5

A reactor equipped with a thermometer, stirrer, heater, rectification column and a water-separation means was charged with 442 parts of pentaerythritol 1061 parts of soybean oil fatty acid, 374 parts of phthalic anhydride and 424 parts of benzoic acid, which were heated to 170° C. under stirring. Into the mixture 24 parts of dibutyltin oxide and 121 parts of regenerated polyethylene terephthalate (regenerated PET) were added. The temperature of the system was then gradually raised to 250° C. over 2 hours. After maintaining the system at said temperature for an hour, 120 parts of xylene for refluxing was added, followed by depolymerization and dehydrative condensation reactions at 230° C. for about 4 hours. Thus an alkyd resin varnish containing 95% of non-volatile component was obtained. Eight (8) hours were required for the production of said alkyd resin varnish. The varnish had a resin acid value of 5.5 mgKOH/g, and when it was diluted to a solution containing 75% of non-volatile component with ethylene glycol mono-n-butyl ether, the solution had a Gardner viscosity (25° C.) of ST.

Then the temperature was lowered to 200° C., and 155 parts of maleic anhydride was added to the solution, followed by 3 hours' maleinizing reaction at 200° C. to give a maleinized alkyd resin varnish. The resin so obtained had a total acid value of 55 mgKOH/g. When this maleinized alkyd resin varnish was diluted to a solution containing 75% of non-volatile component with ethylene glycol mono-n-butyl ether, the solution had a sGardner viscosity (25° C.) of $Z_1$.

After removing the xylene in the maleinized alkyd resin varnish under reduced pressure, the remaining system was cooled. When the temperature dropped to 100° C., 480 parts of ethylene glycol mono-n-butyl ether was charged, and when the temperature further came down to about 60° C., 238 parts of triethylamine was added. After mixing the system at about 60° C. for 30 minutes by stirring, 1682 parts of deionized water was gradually added under high-speed stirring, to give an aqueous alkyd resin dispersion containing 51% of non-volatile component.

Comparative Example 3

A reactor equipped with a thermometer, stirrer, heater, a rectification column and a water separation means was charged with 472 parts of pentaerythritol, 130 parts of regenerated polyethylene terephthalate (regenerated PET) and 24 parts of dibutyltin oxide. The temperature was raised to 230° C., and at which temperature the reaction was carried out for about 3 hours until the regenerated PET dissolved and reacted, to give a transparent reaction product. Then 120 parts of xylene for refluxing, 1134 parts of soybean oil fatty acid, 400 parts of phthalic anhydride and 453 parts of benzoic acid were charged, the temperature of the system was raised to 230° C. under stirring over the subsequent 3 hours, and the dehydrative condensation reaction was conducted at 230° C. for about 4 hours. Thus an alkyd resin varnish having a resin acid value of about 4.9 mgKOH/g and containing 95% of non-volatile component was obtained. Eleven (11) hours were required for the production of said alkyd resin varnish. When this alkyd resin varnish was diluted with ethylene glycol mono-n-butyl ether to a solution containing 75% of non-volatile component, the solution had a Gardner viscosity (25° C.) of TU.

Then the temperature was lowered to 200° C., and 155 parts of maleic anhydride was added to the solution, followed by 3 hours' maleinizing reaction at 200° C. to give a maleinized alkyd resin varnish. The resin so obtained had a total acid value of 53 mgKOH/g. When this maleinized alkyd resin varnish was diluted to a solution containing 75% of non-volatile component with ethylene glycol mono-n-butyl ether, the solution had a Gardner viscosity (25° C.) of $Z_2$.

After removing the xylene in the maleinized alkyd resin varnish under reduced pressure, the remaining system was cooled. When the temperature dropped to 100° C., 480 parts of ethylene glycol mono-n-butyl ether was charged, and when the temperature further came down to about 60° C., 238 parts of triethylamine was added. After mixing the system at about 60° C. for 30 minutes by stirring, 1682 parts of deionized water was gradually added under high-speed stirring, to give an aqueous alkyd resin dispersion containing 53% of non-volatile component.

Comparative Example 4

A reactor equipped with a thermometer, stirrer, heater, rectification column and a water-separation means was charged with 495 parts of pentaerythritol, 1187 parts of soybean oil fatty acid, 444 parts of phthalic anhydride, 474 parts of benzoic acid, 24 parts of dibutyltin oxide and 120 parts of xylene. The temperature of the system was then raised from 160° C. to 230° C. over the subsequent 3 hours, and the dehydrative condensation reaction was conducted at 230° C. for about 8 hours. An alkyd resin varnish having a resin acid value of about 7.0 mgKOH/g and containing 95% of non-volatile component was obtained. For the production of same alkyd resin varnish, 12 hours were required. When this alkyd resin varnish was diluted with ethylene glycol mono-n-butyl ether to a solution containing 75% of non-volatile component, the solution had a Gardner viscosity (25° C.) of QR.

Then the temperature was lowered to 200° C., and 155 parts of maleic anhydride was added to the solution, followed by 3 hours' maleinizing reaction at 200° C. to give a maleinized alkyd resin varnish. The resin so obtained had a total acid value of 55 mgKOH/g. When this maleinized alkyd resin varnish was diluted to a solution containing 75% of non-volatile component with ethylene glycol mono-n-butyl ether, the solution had a Gardner viscosity (25° C.) of $Z_1$.

After removing the xylene in the maleinized alkyd resin varnish under reduced pressure, the remaining system was cooled. When the temperature dropped to 100° C., 480 parts of ethylene glycol mono-n-butyl ether was charged, and when the temperature further came down to about 60° C., 238 parts of triethylamine was added. After mixing the system at about 60° C. for 30 minutes by stirring, 1682 parts of deionized water was gradually added under high-speed stirring, to give an aqueous alkyd resin dispersion containing 55% of non-volatile component.

Example 6

A reactor equipped with a thermometer, stirrer, heater, rectification column and a water-separation means was charged with 317 parts of pentaerythritol 64 parts of glycerine, 210 parts of ethylene glycol, 739 parts of soybean oil fatty acid and 837 parts of phthalic anhydride, which were heated to 170° C. under stirring. Into the mixture 24 parts of dibutyltin oxide and 290 parts of regenerated polyethylene terephthalate (regenerated PET) were charged, and the temperature was raised to 250° C., consuming 2 hours. The system was maintained at 250° C. for an hour, and 120 parts of xylene for refluxing was added. Depolymerization and dehydrative condensation reactions were conducted for about further 2 hours at 210° C. Upon confirming that the resin acid value was reduced to no higher than 5.0 mgKOH/g, the system was cooled to 170° C. to provide an alkyd resin varnish containing 95% of non-volatile component. Seven (7) hours were required for the preparation of this alkyd resin varnish. The varnish had a resin acid value of 4.9 mgKOH/g, and when this alkyd resin varnish was diluted to a solution containing 60% of non-volatile component with xylene, the solution had a Gardner viscosity (25° C.) of $Z_2$.

To the entire amount of the above alkyd resin varnish of about 170° C. in temperature, 87 parts of trimellitic anhydride was added and maintained at 170° C. for 2 hours. Then the xylene in the system was removed under reduced pressure, and the system was cooled. When the temperature came down to 100° C., 480 parts of ethylene glycol mono-n-butyl ether was charged and when it further came down to 60° C., 91 parts of triethylamine was charged. After mixing the system at about 60° C. for 30 minutes, 1830 parts of deionized water was gradually added under high-speed stirring, to give an aqueous alkyd resin dispersion containing 50% of non-volatile component.

Example 7

A reactor equipped with a thermometer, stirrer, heater, rectification column and a water-separation means was charged with 286 parts of pentaerythritol 63 parts of glycerine, 190 parts of ethylene glycol, 666 parts of soybean oil fatty acid and 755 parts of phthalic anhydride, which were heated to 170° C. under stirring. Into the mixture 24 parts of dibutyltin oxide and 261 parts of regenerated polyethylene terephthalate (regenerated PET) were charged, and the temperature was raised to 250° C., consuming 2 hours. The system was maintained at 250° C. for 2 hours, and 120 parts of xylene for refluxing was added. Depolymerization and dehydrative condensation reactions were conducted for about further 2 hours at 210° C. Upon confirming that the resin acid value was reduced to no higher than 5.0 mgKOH/g, the system was cooled to 170° C. to provide an alkyd resin varnish containing 95% of non-volatile component. Seven (7) hours were required for the preparation of this alkyd resin varnish. The varnish had a resin acid value of 4.9 mgKOH/g, and when this alkyd resin varnish was diluted to a solution containing 60% of non-volatile component with xylene, the solution had a Gardner viscosity (25° C.) of $Z_2$.

To the entire amount of the above alkyd resin varnish of about 120° C. in temperature, 314 parts of hexahydrophthalic anhydride was added and maintained at 120° C. for 2 hours. Then the xylene in the system was removed under reduced pressure, and the system was cooled. When the temperature came down to 100° C., 480 parts of ethylene glycol mono-n-butyl ether was charged and when it further came down to 60° C., 206 parts of triethylamine was charged. After mixing the system at about 60° C. for 30 minutes, 1714 parts of deionized water was gradually added under high-speed stirring, to give an aqueous alkyd resin dispersion containing 53% of non-volatile component.

Comparative Example 5

A reactor equipped with a thermometer, stirrer, heater, rectification column and a water-separation means was charged with 317 parts of pentaerythritol 69 parts of glycerine, 210 parts of ethylene glycol, 290 parts of regenerated polyethylene terephthalate (regenerated PET) and 24 parts of dibutyltin oxide. The temperature was raised to 230° C., and at which temperature the reaction was carried out for about 3 hours until the regenerated PET dissolved and reacted, to give a transparent reaction product. Then 120 parts of xylene for refluxing, 739 parts of soybean oil fatty acid and 837 parts of phthalic anhydride were charged, the temperature of the system was raised to 210° C. under stirring over the subsequent 3 hours, and the dehydrative condensation reaction was conducted at 210° C. for about 2 hours. Upon confirming that the resin acid value was reduced to no higher than 5.0 mgKOH/g, the system was cooled to 170° C. to provide an alkyd resin varnish containing 95% of non-volatile component. Nine (9) hours were required for the preparation of this alkyd resin varnish. The varnish had a resin acid value of 4.5 mgKOH/g, and when this alkyd resin varnish was diluted to a solution containing 60% of non-volatile component with xylene, the solution had a Gardner viscosity (25° C.) of $Z_3$.

To the entire amount of the above alkyd resin varnish of about 170° C. in temperature, 87 parts of trimellitic anhydride was added and maintained at 170° C. for 2 hours. Then the xylene in the system was removed under reduced pressure, and the system was cooled. When the temperature came down to 100° C., 480 parts of ethylene glycol mono-n-butyl ether was charged and when it further came down to 60° C., 91 parts of triethylamine was charged. After mixing the system at about 60° C. for 30 minutes, 1830 parts of deionized water was gradually added under high-speed stirring, to give an aqueous alkyd resin dispersion containing 53% of non-volatile component.

Comparative Example 6

A reactor equipped with a thermometer, stirrer, heater, rectification column and a water-separation means was charged with 332 parts of pentaerythritol, 73 parts of glycerine, 294 parts of ethylene glycol 775 parts of soybean oil fatty acid, 1111 parts of phthalic anhydride, 24 parts of dibutyltin oxide and 120 parts of xylene for refluxing. The temperature of the system was raised from 160° C. to 210° C. consuming 3 hours, and the dehydrative condensation reaction was conducted at 210° C. for about 3 hours. Upon confirming that the resin acid value was reduced to no higher than 5.0 mgKOH/g, the system was cooled to 170° C. to provide an alkyd resin varnish containing 95% of non-volatile component. Eight (8) hours were required for the preparation of this alkyd resin varnish. The varnish had a resin acid value of 4.7 mgKOH/g, and when this alkyd resin varnish was diluted to a solution containing 60% of non-volatile component with xylene, the solution had a Gardner viscosity (25° C.) of $Z_3$.

To the entire amount of the above alkyd resin varnish of about 120° C. in temperature, 314 parts of hexahydrophthalic anhydride was added and maintained at 120° C. for 2 hours. Then the xylene in the system was removed under reduced pressure, and the system was cooled. When the temperature came down to 100° C., 480 parts of ethylene glycol mono-n-butyl ether was charged and when it further came down to 60 0C., 206 parts of triethylamine was charged. After mixing the system at about 60° C. for 30 minutes, 1714 parts of deionized water was gradually added under high-speed stirring, to give an aqueous resin dispersion containing 53% of non-volatile component.

Example 8

A reactor equipped with a thermometer, stirrer, heater, rectification column and a water-separation means was charged with 424 parts of pentaerythritol 1196 parts of soybean oil fatty acid, 342 parts of phthalic anhydride and 478 parts of benzoic acid, which were heated to 170° C. under stirring. Into the mixture 24 parts of dibutyltin oxide and 137 parts of regenerated polyethylene terephthalate (regenerated PET) were charged, and the temperature was raised to 250° C., consuming 2 hours. The system was maintained at the same temperature for an hour, and 120 parts of xylene for refluxing was added. Depolymerization and dehydrative condensation reactions were conducted for about further an hour at 230° C. to give an alkyd resin varnish having a resin acid value of about 42 mgKOH/g and containing 95% of non-volatile component. Five (5) hours were required for the production of said alkyd resin varnish. When this alkyd resin varnish was diluted with ethylene glycol mono-n-butyl ether to a solution containing 75% of non-volatile component, the solution had a Gardner viscosity (25° C.) of G.

Then the xylene in the above alkyd resin varnish was removed under reduced pressure, and the system was cooled. When the temperature came down to 100° C., 480 parts of ethylene glycol mono-n-butyl ether was charged and when it further came down to 60° C., 181 parts of triethylamine was charged. After mixing the system at about 60° C. for 30 minutes, 1740 parts of deionized water was gradually added under high-speed stirring, to give an aqueous resin dispersion containing 50% of non-volatile component.

Example 9

A reactor equipped with a thermometer, stirrer, heater, rectification column and a water-separation means was charged with 424 parts of pentaerythritol 1196 parts of soybean oil fatty acid, 342 parts of phthalic anhydride and 478 parts of benzoic acid, which were heated to 170° C. under stirring. Into the mixture 24 parts of dibutyltin oxide and 137 parts of regenerated polyethylene terephthalate (regenerated PET) were charged, and the temperature was raised to 250° C., consuming 2 hours. The system was maintained at the same temperature for an hour, and 120 parts of xylene for refluxing was added. Depolymerization and dehydrative condensation reactions were conducted for about 3 hours at 230° C. to give an alkyd resin varnish having a resin acid value of about 21 mgKOH/g and containing 95% of non-volatile component. Seven (7) hours were required for the production of said alkyd resin varnish. When this alkyd resin varnish was diluted with ethylene glycol mono-n-butyl ether to a solution containing 75% of non-volatile component, the solution had a Gardner viscosity (25° C.) of GH.

Then the xylene in the above alkyd resin varnish was removed under reduced pressure, and the system was cooled. When the temperature came down to 100° C., 480 parts of ethylene glycol mono-n-butyl ether was charged and when it further came down to 60° C., 91 parts of triethylamine was charged. After mixing the system at about 60° C. for 30 minutes, 1830 parts of deionized water was gradually added under high-speed stirring, to give an aqueous alkyd resin dispersion containing 51% of non-volatile component.

Comparative Example 7

A reactor equipped with a thermometer, stirrer, heater, rectification column and a water-separation means was charged with 424 parts of pentaerythritol 137 parts of regenerated polyethylene terephthalate (regenerated PET) and 24 parts of dibutyltin oxide. The temperature was raised to 230° C., and at which temperature the reaction was carried out for about 3 hours until the regenerated PET dissolved and reacted, to give a transparent reaction product. Then 120 parts of xylene for refluxing, 1196 parts of soybean oil fatty acid, 342 parts of phthalic anhydride and 478 parts of benzoic acid were charged, the temperature of the system was raised from 180° to 230° C. under stirring over the subsequent 3 hours, and the dehydrative condensation reaction was conducted at 230° C. for about an hour. Thus an alkyd resin varnish having a resin acid value of about 40 mgKOH/g and containing 95% of non-volatile component was obtained. Seven (7) hours were required for the production of said alkyd resin varnish. When this alkyd resin varnish was diluted with ethylene glycol mono-n-butyl ether to a solution containing 75% of non-volatile component, the solution had a Gardner viscosity (25° C.) of H.

Then the xylene in the system was removed under reduced pressure, and the system was cooled. When the temperature came down to 100° C., 480 parts of ethylene glycol mono-n-butyl ether was charged and when it further came down to 60° C., 181 parts of triethylamine was charged. After mixing the system at about 60° C. for 30 minutes, 1740 parts of deionized water was gradually added under high-speed stirring, to give an aqueous alkyd resin dispersion containing 52% of non-volatile component.

Preparation of Water-borne Paint Compositions

Examples 10–18 and Comparative Examples 8–14

Each of the aqueous alkyd resin dispersions which were obtained in the above Examples 1–9 and Comparative Examples 1–7 (each in the amount of 100 parts as solid) was mixed with 0.6 part of DICNAT 1000W™ (a metal dryer, Dainippon Ink Chemical Industries) to provide aqueous paint compositions.

Test Examples 1–9 and Comparative Test Examples 1–7

Each of the water paint compositions was applied to a clean, degreased mild steel sheet to a dry paint film thickness of about 30 $\mu$m, and the sheets were allowed to stand in a room of 20° C. and 65% RH for 7 days to dry. Thus test panels with hardened paint film were obtained, which were subjected to the following tests. The results were as given in the later appearing Table 1.

Test Methods

Pencil Hardness:

The pencil scratch test in accordance with JIS K-5400 8.4.2 (1990) was conducted and the test result was evaluated by breakage method.

Corrosion Resistance:

Each paint film was cut with a knife to leave a cross-marked incision deep enough to reach the base sheet, and subjected to a 72 hours' salt spray test following JIS Z2371. The evaluation was made according to the extent of rust or blister developed from the incision with knife. Where the maximum width of the rust or blister was less than 1 mm from the cut portion (single side), the evaluation is O (good); where it was no less than 1 mm but less than 3 mm (single side), the evaluation is Δ (rather poor) and where it was 3 mm or more (single side), x (poor).

TABLE 1

| | Test Example | | | | | | | | | Comparative Test Example | | | | | | |
|---|---|---|---|---|---|---|---|---|---|---|---|---|---|---|---|---|
| Example No. | 1 | 2 | 3 | 4 | 5 | 6 | 7 | 8 | 9 | 1 | 2 | 3 | 4 | 5 | 6 | 7 |
| Kind of water paint | Example | | | | | | | | | Comparative Example | | | | | | |
| (Example No.) | 10 | 11 | 12 | 13 | 14 | 15 | 16 | 17 | 18 | 8 | 9 | 10 | 11 | 12 | 13 | 14 |
| Kind of aqueous alkyd resin dispersion used in water-borne paint | Example | | | | | | | | | Comparative Example | | | | | | |
| (Example No.) | 1 | 2 | 3 | 4 | 5 | 6 | 7 | 8 | 9 | 1 | 2 | 3 | 4 | 5 | 6 | 7 |
| Test Result — Pencil hardness | 3B | 3B | 3B | 3B | 3B | 2B | 2B | 3B | 3B | 3B | 3B | 3B | 3B | 2B | 2B | 3B |
| Test Result — Corrosion resistance | O | O | O | O | O | O | O | O | O | O | O | O | O | O | O | O |

According to the above-described processes of the present invention, aqueous alkyd resin dispersions using polyester resins, which are recovered from waste materials and regenerated, can be prepared within a short time. Because the processes utilize waste materials, disused PET bottles and the like can be put to recycled use.

The aqueous alkyd resin dispersions which are obtained through the processes of the invention can be conveniently used as aqueous resin dispersions for normal temperature-curing type paints, or those for thermosetting type paints, in combination with curing agents. Because they are water-based, they are suitable for preservation of terrestrial environment. The aqueous alkyd resin dispersions prepared by the processes of this invention, furthermore, can be transparent and free from turbidity, although they contain terephthalic acid component.

What is claimed is:

1. A process for producing an aqueous alkyd resin dispersion which is characterized by comprising:
   (A-1) a step of synthesizing an alkyd resin by depolymerizing polyester resin whose chief starting material is terephthalic acid and which has been recovered from waste materials and regenerated, while carrying out its esterification at the same time, by dissolving the polyester resin in a mixture of an alcoholic component in which the weight ratio of tri- or lower polyhydric alcohol to tetra- or higher hydric alcohol as the former/latter is within a range of 0–20, a fatty acid and/or an oil and fat, and polybasic acid component, and
   (C-1) a step of dispersing the alkyd resin, which is obtained in the above step (A-1), in water, in the presence of 3–15 parts by weight of surfactant per 100 parts by weight of said alkyd resin.

2. A process for producing an aqueous alkyd resin dispersion, which is characterized by comprising:
   (A-2) a step of synthesizing an alkyd resin having a hydroxyl value of 0.1–50 mgKOH/g by depolymerizing polyester resin whose chief starting material is terephthalic acid and which has been recovered from waste materials and regenerated, while carrying out its esterification at the same time, by dissolving the polyester resin in a mixture of an alcoholic component in which the weight ratio of tri- or lower polyhydric alcohol to tetra- or higher hydric alcohol as the former/latter is within a range of 0–20, a fatty acid and/or an oil and fat, and polybasic acid component,
   (B-2) a step for obtaining a maleinized alkyd resin having an acid value of 10–200 mgKOH/g by reacting the alkyd resin as obtained in the above step (A-2) with maleic anhydride, and
   (C-2) a step of neutralizing and dispersing in water the maleinized alkyd resin as obtained in the above step (B-2).

3. A process for producing an aqueous alkyd resin dispersion, which is characterized by comprising:
   (A-3) a step of synthesizing an alkyd resin having a hydroxyl value of 5–200 mgKOH/g by depolymerizing polyester resin whose chief starting material is terephthalic acid and which has been recovered from waste materials and regenerated, and carrying out its esterification at the same time, by dissolving the polyester resin in a mixture of an alcoholic component in which the weight ratio of tri- or lower polyhydric alcohol to tetra- or higher hydric alcohol as the former/latter is within a range of 0–20, a fatty acid and/or an oil and fat, and polybasic acid component,
   (B-3) a step for obtaining a modified alkyd resin having an acid value of 10–200 mgKOH/g by reacting the alkyd resin as obtained in the above step (A-3) with an acid anhydride having no ethylenically unsaturated radical, and
   (C-3) a step of neutralizing and dispersing in water the modified alkyd resin as obtained in the above step (B-3).

4. A process for producing an aqueous alkyd resin dispersion, which is characterized by comprising:
   (A-4) a step of synthesizing an alkyd resin having an acid value of 10–200 mgKOH/g by depolymerizing polyester resin whose chief starting material is terephthalic acid and which has been recovered from waste materials and regenerated, while carrying out its esterification at the same time, by dissolving the polyester resin in a mixture of an alcoholic component in which the weight ratio of tri- or lower polyhydric alcohol to tetra- or higher hydric alcohol as the former/latter is within a range of 0–20, a fatty acid and/or an oil and fat, and polybasic acid component, and (C-4) a step of neutralizing and dispersing in water the alkyd resin as obtained in the above step (A-4).

5. A process according to any one of claims 1–4, in which the weight ratio of tri- or lower polyhydric alcohol to tetra- or higher hydric alcohol in the alcoholic component as the former/latter is within a range of 0.02–10.

6. A process according to any one of claims 1–4, in which the tetra- of higher hydric alcohol is selected from the group consisting of diglycerine, triglycerine, pentaerythritol, di-pentaerythritol and sorbitol.

7. A process according to claim 6, in which the tetra- or higher hydric alcohol is pentaerythritol.

8. A process according to any one of claims 1–4, in which the tri- or lower polyhydric alcohol is selected from the group consisting of trimethylolpropane, trimethylolethane, glycerine, ethylene glycol, diethylene glycol, triethylene glycol, propylene glycol, 1,3-propanediol, 1,4-butanediol, 1,5-pentanediol, neopentyl glycol, 1,6-hexanediol and 1,4-dimethylolcyclohexane.

9. A process according to claim 8, in which the tri- or lower polyhydric alcohol is glycerine, ethylene glycol, diethylene glycol, triethylene glycol or propylene glycol.

10. A process according to any one of claims 1–4, in which the fatty acid is a semi-drying oil fatty acid or a drying oil fatty acid, and the oil and fat is a semi-drying oil or drying oil.

11. A process according to any one of claims 1–4, in which the polybasic acid component is selected from the group consisting of dibasic acids such as phthalic anhydride, isophthalic acid, terephthalic acid, tetrahydrophthalic anhydride, hexahydrophthalic anhydride, naphthalenedicarboxylic acid, 4,4'-biphenyldicarboxylic acid, diphenylmethane-4,4'-dicarboxylic acid, succinic acid, fumaric acid, adipic acid, sebacic acid and maleic anhydride and $C_1$–$C_6$ alkyl esters thereof.

12. A process according to any one of claims 1–4, in which the polyester resin recovered from waste materials is at least one resin selected from the group consisting of recycled polyethylene terephthalate and recycled polybutylene terephthalate.

13. A process according to any one of claims 1–4, in which the polyester resin is used in an amount of 5–40% by weight, based on the sum of the polyester resin, alcoholic component, fatty acid and/or oil and fat, and the polybasic acid.

14. A process according to claim 13, in which the polyester resin is used in an amount of 10–35% by weight, based on the sum of the polyester resin, alcoholic component, fatty acid and/or oil and fat, and the polybasic acid.

15. A process according to any one of claims 1–4, in which the polyester resin and if necessary a depolymerization catalyst are added into a mixture of the alcoholic component, the fatty acid and/or oil and fat, and the polybasic acid component, and subjected to depolymerization and esterification reactions.

16. A process according to claim 15, in which the depolymerization catalyst is selected from the group consisting of monobutyltin hydroxide, dibutyltin oxide, monobutyltin-2-ethyl hexanoate, dibutyltin dilaurate, stannous oxide, tin acetate, zinc acetate, manganese acetate, cobalt acetate, calcium acetate, lead acetate, litharge, antimony trioxide, tetrabutyl titanate and tetraisopropyl titanate.

17. A process according to claim 15, in which the depolymerization catalyst is used within a range of 0.0005–10 parts by weight, per 100 weight parts of the total sum of the polyester resin, alcoholic component, the fatty acid and/or oil and fat, and the polybasic acid component.

18. A process according to claim 15, in which the depolymerzation and esterification reactions are conducted at a temperature within a range of 160–270° C.

19. A process according to claim 15, in which a minor amount of phosphorus compound is added to the reaction system.

20. A process according to claim 1, in which the polybasic acid component is used at such a ratio that the equivalent number of the carboxyl groups in the polybasic acid component per hydroxyl equivalent in the alcoholic component falls within a range of 0.5–1.

21. A process according to claim 1, in which the alkyd resin which is obtained in the step (A-1) has a number-average molecular weight ranging 2,000–24,000, a hydroxyl value ranging 0.1–150 mgKOH/g, and an acid value ranging 0.1–150 mgKOH/g.

22. A process according to claim 2, in which the polybasic acid component is used at such a ratio that the equivalent number of the carboxyl groups in the polybasic acid component per hydroxyl equivalent in the alcoholic component falls within a range of 0.2–1.2.

23. A process according to claim 2, in which the alkyd resin which is obtained in the step (A-2) has a number-average molecular weight ranging 2,000–24,000 and a hydroxyl value ranging 0.1–150 mgKOH/g.

24. A process according to claim 2, in which the maleinized alkyd resin which is obtained in the step (B-2) has an acid value ranging 10–200 mgKOH/g.

25. A process according to claim 3, in which the polybasic acid component is used at such a ratio that the equivalent number of the carboxyl groups in the polybasic acid component per hydroxyl equivalent in the alcoholic component falls within a range of 0.5–0.98.

26. A process according to claim 3, in which the alkyd resin which is obtained in the step (A-3) has a number-average molecular weight ranging 2,000–24,000 and an acid value ranging 0.1–150 mgKOH/g.

27. A process according to claim 3, in which the acid anhydride free of ethylenically unsaturated radicals is selected from the group consisting of phthalic anhydride, trimellitic anhydride, hexahydrophthalic anhydride, tetrahydrophthalic anhydride, succinic anhydride and maleic anhydride.

28. A process according to claim 3, in which the modified alkyd resin which is obtained in the step (B-3) has an acid value ranging 5–200 mgKOH/g.

29. A process according to claim 4, in which the polybasic acid component is used at such a ratio that the equivalent number of the carboxyl groups in the polybasic acid component per hydroxyl equivalent in the alcoholic component falls within a range of 0.5–1.5.

30. A process according to claim 4, in which the alkyd resin which is obtained in the step (A-4) has a number-average molecular weight ranging 2,000–24,000 and a hydroxyl value ranging 0.1–150 mgKOH/g.

* * * * *